United States Patent Office 3,564,844
Patented Feb. 23, 1971

3,564,844
PRESSURE RATIO CONTROL SYSTEM FOR
A GAS TURBINE ENGINE
Ronald Rimmer, Cheltenham, England, assignor to Dowty
Fuel Systems Limited, Cheltenham, England, a British
company
Filed July 18, 1969, Ser. No. 843,153
Claims priority, application Great Britain, July 18, 1968,
34,172/68
Int. Cl. F02c 9/10; F15c 1/14
U.S. Cl. 60—39.28                                    4 Claims

ABSTRACT OF THE DISCLOSURE

A pressure ratio control system for a gas turbine engine having a fuel pump together with means regulating fuel flow to the engine burners, comprising a pressure ratio-sensing device having a discharge nozzle and a receiver nozzle co-axially spaced therefrom, the diameters and spacing of the nozzles being such that in the region of a predetermined critical ratio of inlet pressure to outlet pressure of the discharge nozzle, the rate of change of pressure in the receiver nozzle, occurring with a change in the discharge nozzle pressure ratio, provides a controlling parameter restrictor means for supplying the inlet and outlet respectively of the discharge nozzle with higher and lower fluid pressures derived from two different pressure sources in the engine compressor, control means operable on the restrictor means to select a discharge nozzle pressure ratio as a selected proportion of the compressor pressure ratio of the two sources, and fluid-operated means arranged to control the fuel flow regulating means in response to a change in the pressure in the receiver nozzle, whereby the rate of combustion of fuel regulates the engine speed and therefore the said compressor pressure ratio such that the discharge nozzle pressure ratio tends towards the predetermined critical value.

---

This invention relates to pressure ratio control systems for gas turbine engines.

In an aircraft gas turbine engine the thrust obtained for a given value of the parameter $N/\sqrt{T_1}$ varies with ambient conditions in a generally similar manner to aircraft drag at a given attitude, so that airspeed tends to remain constant. Also there exists for a given engine, a unique relationship between $N/\sqrt{T_1}$ and $P_4/P_1$, where:

N is engine rotational speed
$T_1$ is engine intake temperature
$P_1$ is compressor inlet pressure
$P_4$ is compresor delivery pressure If therefore the fuel flow to the engine is varied by a control member which selects the pressure ratio $P_4/P_1$, the effect is substantially equivalent to a selection of $N/\sqrt{T_1}$ in maintaining airspeed.

According to the present invention a pressure ratio control system for a gas turbine engine having a fuel pump together with means regulating fuel flow to the engine burners, comprises a pressure ratio-sensing device having a discharge nozzle and a receiver nozzle co-axially spaced therefrom, the diameters and spacing of the nozzles being such that in the region of a pre-determined critical ratio of inlet pressure to outlet pressure of the discharge nozzle, the rate of change of pressure in the receiver nozzle, occurring with a change in the discharge nozzle pressure ratio, provides a controlling parameter, restrictor means for supplying the inlet and outlet respectively of the discharge nozzle with higher and lower fluid pressures derived from two different pressure sources in the engine compressor, control means operable on the restrictor means to select a discharge nozzle pressure ratio as a selected proportion of the compressor pressure ratio of the two sources, and fluid-operated means arranged to control the fuel flow regulating means in response to a change in the pressure in the receiver nozzle, whereby the rate of combustion of fuel regulates the engine speed and therefore the said compressor pressure ratio such that the discharge nozzle pressure ratio tends towards the pre-determined critical value.

Figure 1:
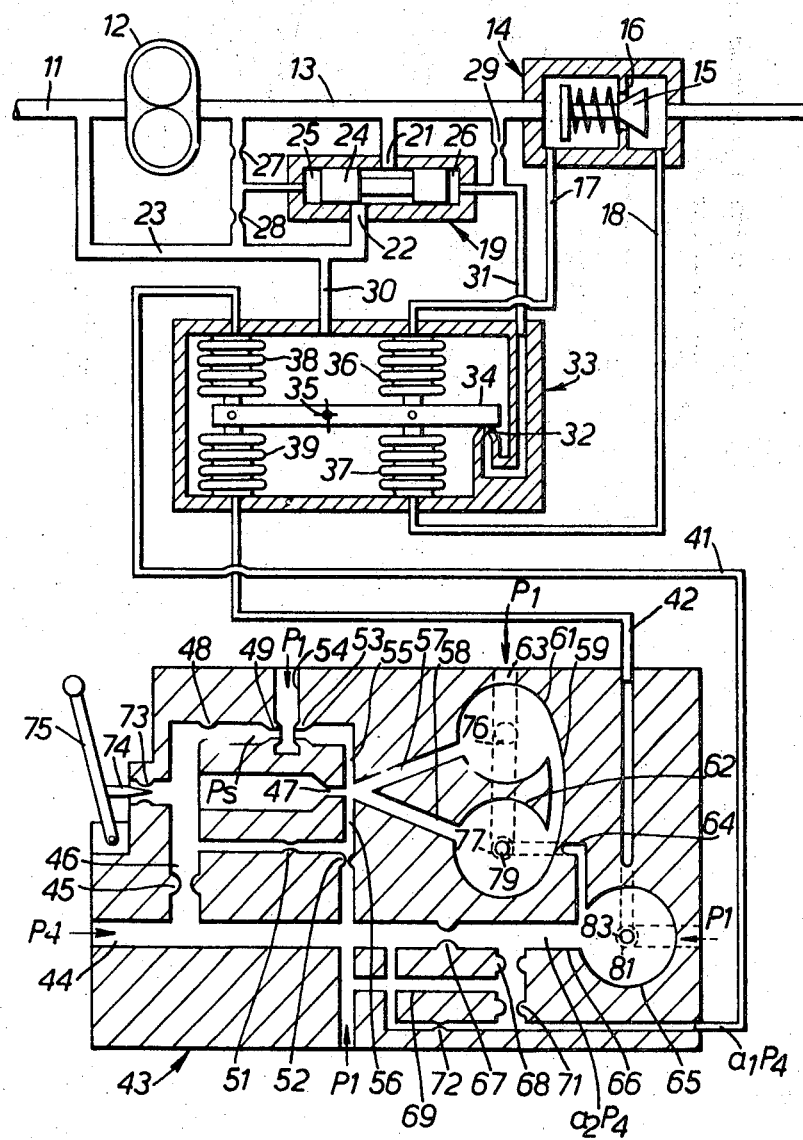
Figure 2:
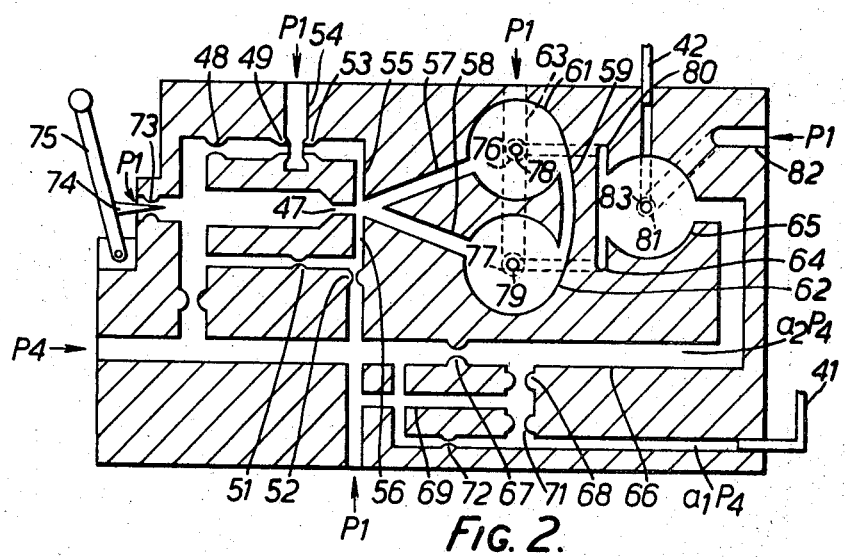
Figure 3:
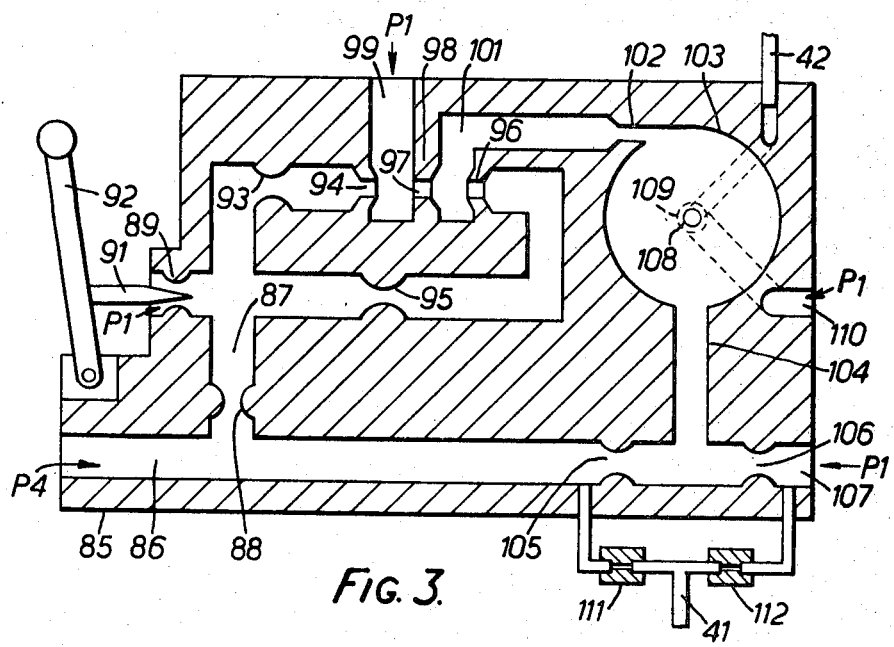
Figure 4:
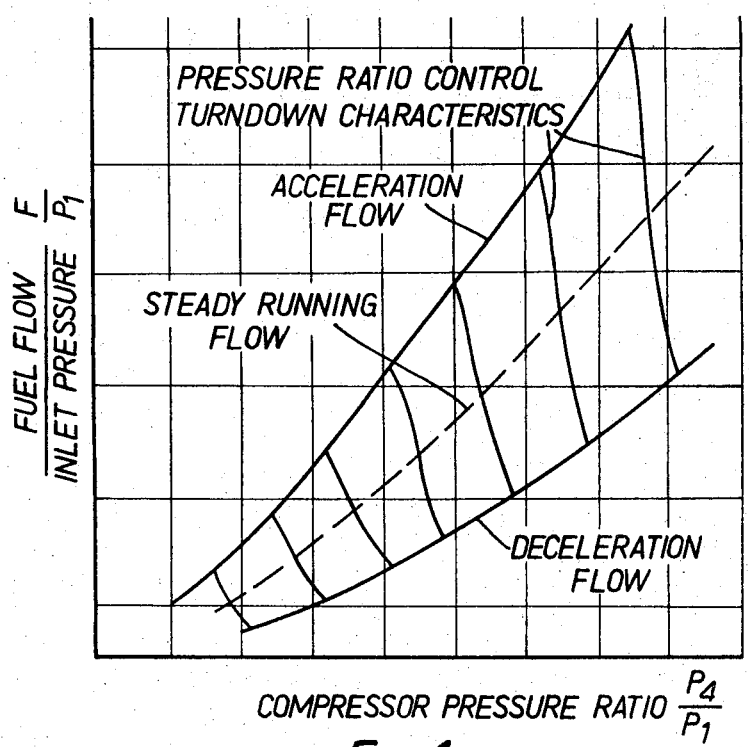

The invention is illustrated in the accompanying diagrammatic drawings, of which:

FIG. 1 shows a fuel supply system for the burners of a gas turbine engine, including a pressure ratio control device, FIG. 2 shows a modification of the pressure ratio control device of FIG. 1, and FIG. 3 shows another form of pressure ratio control device, and FIG. 4 is a graph showing operating characteristics.

The fuel supply system of FIG. 1 has an inlet pipe 11 leading from the fuel source to a pump 12. A delivery pipe 13 from the pump has a metering valve 14 interposed therein, comprising a spring-loaded plug member 15 co-operating with a fixed orifice 16 to give a pressure difference in pipes 17, 18 connected upstream and downstream of the orifice 16, which is substantially directly proportional to fuel flow.

Fuel flow is regulated by a spill valve 19 which has a cylinder bore provided with an open port 21 connected to the delivery pipe 13 and a throttled port 22 connected by a pipe 23 to the inlet pipe 11. A spool 24 controls the throttled port 22 in response to the fluid pressures in chambers 25, 26 at opposite ends of the bore. The chamber 25 is connected to a tapping between two fixed restrictors 27 and 28 which are arranged in series between the pipes 13 and 23 so that the pressure therein is a fixed proportion of the difference between pump delivery pressure and pump inlet pressure. The chamber 26 is connected by a tapping between a fixed restrictor 29 in a branch 31 from the pipe 13, and a variable orifice 32 at the end of the branch 31.

The variable orifice 32 is disposed in a servo device 33 having a beam 34 which is supported intermediately on a pivot 35, and which has one end forming a variable closure for the orifice 32. A vent passage 30 returns liquid spilled from the orifice 32 to the pipe 23.

Capsules 36, 37 acting oppositely on the beam 34 at a position between the pivot 35 and the orifice 32 are actuated by fluid pressures in the pipes 17 and 18 respectively. A further pair of capsules 38, 39 act oppositely on the opposite end of the beam under pressures in two pipes 41, 42 respectively which receive pressure signals from a pressure ratio control device 43.

In the system thus far described, the servo device 33 tends to maintain a constant fuel flow through the metering valve 14 for any given difference between the pressures in the pipes 41 and 42, because the pilot valve formed by the orifice 32 and beam 34 applies a correcting pressure change in the chamber 26 in response to an error signal in the capsules 36, 37 which corresponds to the difference between selected flow and actual flow through the metering valve 14.

The pressure ratio control device 43 is generally similar to that described in U.S. Ser. No. 727,781 filed May 9, 1968, now Pat. No. 3,489,009. A pressure ratio sensing device is provided having a discharge nozzle 49 supplied at its inlet and outlet respectively with higher and lower fluid pressures respectively derived from compressor delivery pressure and compressor inlet pressure through restrictor means. Compressor delivery pressue $P_4$ is supplied to a duct 44 which leads though a restrictor 45 to a second duct 46. This second duct supplies a power jet nozzle 47, a further restrictor 48 leading to the discharge nozzle 49, and a matching potentiometer consisting of two fixed restrictors 51, 52 in series, the second of these restrictors 52 discharging to compressor inlet pressure $P_1$. The pressure ratio senser includes a receiver nozzle 53 axially spaced from the discharge nozzle 49 across a vent 54 which is at pressure $P_1$. The receiver nozzle 53 communicates with a control passage 55. A second control passage 56 is connected between the restrictors 51, 52. Pressures in these control passages control the deflection of the power jet from the nozzle 47 into one or other of two outlet passages 57, 58. The fluid switch thus provided is generally of the kind described in U.S. Ser. No. 649,068 filed June 8, 1967, now Pat. No. 3,470,894. It has two vortex chambers 61, 62 into which the passages 57, 58 enter radially, and a passage 59 tangentially interconnecting the chambers 61, 62. Circular vents 76, 77 at the centres of the chambers 61, 62 are connected by a passage 63 to pressure $P_1$, each vent having an area less than that of the power jet nozzle 47. A circular outlet 79 on the opposite side of the chamber 62 from the vent 77, and of lesser diameter than the vent 77, leads into a passage 64 which opens tangentially into an output vortex amplifier 65.

A radial input passage 66 to the latter is maintained at a pressure designated $a_2P_4$, which is selected at a fixed proportion of $P_4$, by means of an air potentiometer consisting of series restrictors 67, 68 interposed between the passage 44 and a vent passage 69 at $P_1$. The vortex amplifier 65, has, in a manner similar to the vortex chamber 62, a central vent 81 connected by passage 82 to the pressure $P_1$, and a central outlet 83 which opens into the pipe 42.

A selected output pressure designated $a_1P_4$, which is a fixed proportion of $P_4$, is maintained in the pipe 41, by means of an air potentiometer consisting of series restrictors 71, 72 interposed between the passage 44 and the vent passage 69.

If during operation of the pressure ratio senser, the ratio of pressure $Ps$ upstream of the nozzle 49 to the pressure $P_1$ downstream of the nozzle rises through a predetermined critcial value, the pressure recovered in the nozzle 53 and the control passage 55 varies in a manner distinctly different from the manner in which pressure varies in the control passage 56 and it thus provides a control parameter which is used for controlling fuel flow as will be described. As the critical value is passed there occurs a reversal of pressure difference in the control passages 55, 56 whereby the power jet is deflected from the outlet passage 57 towards the outlet passage 58. The fluid switch is constructed as a proportional amplifier so that over the operating range of pressure ratio $Ps/P_1$, the pressure output in the passage 64 is substantially proportional to the pressure difference between the control passages 55, 56.

In order to relate the critical of pressure ratio $Ps/P_1$ to a given value of the pressure ratio $P_4/P_1$, a variably restricted vent orifice 73 opening to pressure $P_1$ is provided from the duct 46. The orifice 73 is variably restricted by a needle valve 74 which is movable by a control lever 75. The restrictors 45 and 73 therefore form a potentiometer which can vary the pressure in the duct 46, and therefore $Ps$ at the nozzle 49.

The control lever 75 therefore provides a means by which any given value of $P_4/P_1$ in a range of values can be selected and that the ratio senser 49, 53 then operates at the critical value to vary the pressure signal in the pipe 42 whereby fuel delivery to the burners is regulated by the servo device 33 and the spill valve 19.

The operation of the device 43 will now be described.

SELECTING INCREASED PRESSURE RATIO

The lever 75 is moved to enlarge the orifice 73, thus reducing the pressure in the duct 46 and therefore the pressure ratio $Ps/P_1$. The recovered pressure in nozzle 53 and control passage 55 rises because the pressure ratio $Ps/P_1$ falls below the critical value, so that the power jet from nozzle 47 is deflected towards the outlet passage 58. The pressure in the output passage 64 increases the vortex in the amplifier 65 so that pressure in the outlet 83, the pipe 42 and capsule 39 falls. The beam 34 then moves to increase flow from the nozzle 32, causing a pressure drop in chamber 26 which moves the spool 24 to reduce spill flow through port 22. The flow through the metering valve 14 therefore increases, and causes an increase of engine speed. If a large selection of increased fuel flow is made, the pressure in the pipe 42 falls to $P_1$. Maximum acceleration of the engine then occurs and is limited by the pressure $a_1P_4$ in the pipe 41 as determined by the restrictors 71 and 72.

The design of the control device 43 provides operation in accordance with a family of three curves relating Fuel Flow/Pressure $P_1$ and Compressor Pressure Ratio $P_4/P_1$, shown in FIG. 4. During maximum acceleration the device operates in accordance with the upper curve designated Acceleration Flow. The curve is defined by the equation $$\frac{F}{P_1} = K_1 \left( a_1 \frac{P_4}{P_1} - 1 \right)$$

where F is flow, and $K_1$ is a constant, while $P_1$, $P_4$ and $a_1$ are as previously defined.

STEADY RUNNING

After a selected increase in pressure ratio has been made, the actual pressure ratio will raise as fuel flow increases. The pressure $Ps$ at the discharge nozzle 49 increases so that the ratio $Ps/P_1$ approaches the critical value. The recovered pressure in the nozzle 53 and control passage 55 decreases whereby the power jet is deflected towards the outlet passage 57. Pressure in the outlet 79 from the vortex chamber 62 and in passage 64 falls so that the vortex in amplifier 65 reduces, thereby allowing the pressure in pipe 42 to increase to an intermediate pressure between $P_1$ at the vent 81 and $a_2P_4$ at the inlet 66, which pressure is substantially attained in the steady state. During steady running, fuel flow through the metering valve 14 is controlled by the servo device 33 as a function of $a_1P_4$ in the capsule 38 and the intermediate pressure in the capsule 39.

The flow characteristic during steady running is illustrated by the intermediate curve of the family of curves shown in FIG. 4.

SELECTING DECREASED PRESSURE RATIO

The lever 75 is moved to reduce the orifice 73. This increases the ratio $Ps/P_1$ across the nozzle 49 and causes pressure in the control passage 55 to fall realtive to pressure in the control passage 56. The power jet is then deflected towards the outlet passage 57 so that the vortex is increased in the chamber 62, thus reducing pressure in the output passage 64. For a large selection of reduced pressure ratio, the power jet is wholly deflected into the outlet passage 57 whereby the pressure in the outlet 79 and the output passage 64 falls to $P_1$. There will then be no vortex in the amplifier 65 and the pressure at the central outlet 83 and in the passage 42 will rise to substantially $a_2P_4$. The increase of pressure in the capsule 39 causes the lever 34 to close on the nozzle 32 and increase the pressure acting in the chamber 26 on the piston 24. The port 22 opens so that more fuel is by-passed and less is delivered to the burners, whereby the speed of the engine falls. The fuel flow during maximum deceleration is controlled by the servo device 33 as a function of $a_1P_4$ in the capsule 38 and $a_2P_4$ in the capsule 39. The difference between these pressures is selected in design to maintain a minimum flow rate during maximum deceleration which prevents flame extinction.

The flow characteristic during maximum deceleration is illustrated by the lower curve designated Deceleration Flow in FIG. 4. The curve is defined by the equation $$\frac{F}{P_1} = K_1(a_1 - d_2)\frac{P_4}{P_2}$$

the factors being as previously defined.

The transition from steady running flow to deceleration flow, or from acceleration flow to steady running flow takes place along a curve having the general form of one or other of the Pressure Ratio Control Turndown Characteristics illustrated in FIG. 4. The actual curve may, of course, lie on a curve in between an adjacent pair of the curves illustrated.

FIG. 2 shows a modification of the pressure ratio control device 43 of FIG. 1, in which corresponding elements in the modified device 84 bear the reference numerals of FIG. 1. The device differs in that the vortex chamber 61 has a central outlet 78 leading into a passage 80 which opens tangentially into the vortex amplifier 65 in opposition to the tangential passage 64 from the central outlet 69 of the vortex chamber 62. During steady running, the power jet from the nozzle 47 is biassed towards the outlet passage 58 so that the larger proportion of the power jet enters the vortex chamber 62 and the remainder enters the vortex chamber 61. The pressure in the outlet 79 and passage 64 exceeds the pressure in the outlet 78 and passage 80, so that the resulting vortex in the vortex amplifier 65 establishes a pressure in the outlet 83 and the passage 42 which lies in between $a_2P_4$ and $P_1$. This pressure acting in the chamber 26 of the spill valve 19 balances the pressure in the chamber 25.

If an increased pressure ratio is selected by movement of the lever 75 to enlarge the orifice 73, the pressure in the nozzle 53 and control passage 55 rises relative to the pressure in the control passage 56 as before, so that a larger proportion of the power jet from the nozzle 47 enters the chamber 62. This increases the vortex in the vortex amplifier 65 whereby the pressure in the outlet 83, the pipe 42 and the capsule 39 falls and causes pressure in the chamber 26 of the spill valve 19 to fall, thus decreasing the spill flow and increasing the actual flow through the metering valve 14 to the burners.

A selection of decreased pressure ratio causes deflection of the power jet towards the outlet passage 57. It is arranged that even the maximum selection will not deflect the power jet beyond the position in which flow is equally divided between the outlet passages 57, 58. In this position the momentum of liquid flow through the tangential passages 64, 80 cancels whereby the pressure $a_2P_4$ in the passage 66 which opens radially into the vortex amplifier, acts also in the outlet 42 to increase the spill flow through the valve 19. Thus it is seen that over the operating range, the power jet has limiting positions in one of which all the liquid flows in the outlet passage 58, and in the other of which liquid flow is equally divided between the outlet passages 57, 58.

The pressure ratio control device 85 of FIG. 3 has a duct 86 supplied with compressor delivery pressure $P_4$. The pressure in a second duct 87 is determined by a fixed restrictor 88 between the ducts 86 and 87, and a variable restrictor provided by vent orifice 89 and needle valve 91, the latter being movable by a hand lever 92. The duct 87 is connected through a further restrictor 93 to the discharge nozzle 94 of a pressure ratio senser, and through another restrictor 95 to a secondary discharge nozzle 96 of the senser. Coaxial with and in between the nozzles 94 and 96 is an orifice 97 formed in a partition 98 separating a space 99 on the discharge side of the nozzle 94 which is vented to a pressure $P_1$, from an output passage 101 which extends from a position between the orifice 97 and the nozzle 96. The passage 101 terminates as a jet orifice 102 which opens tangentially into a vortex amplifier 103. A radial inlet 104 in the amplifier is connected by way of a fixed restrictor 105 to the duct 86 at pressure PA, and by way of a fixed restrictor 106 to a vent 107 at pressure $P_1$. A central outlet 108 in the vortex amplifier is connected to the pipe 42, and a central vent 109 is connected to a passage 110 at pressure $P_1$. The pipe 41 leads from a centre tapping between two fixed restrictors 111, 112 which are arranged in series between the duct 86 and the vent 107.

In operating at the steady running condition, the pressure ratio across the nozzle 94 is near the critical value whereby the plane of impact between the primary jet stream from the nozzle 94, and the secondary jet from the secondary nozzle 96 lies on that side of the receiver nozzle 97 which is adjacent the primary discharge nozzle 94. The pressure in the outlet 101 is then at an intermediate value between the pressure at the secondary nozzle 96 and the pressure of the vent 99.

If the orifice 89 is enlarged to select a higher engine pressure ratio, the pressure ratio across the primary nozzle 94 decreases so that the plane of impact advances towards the orifice 97. Discharge of the secondary jet to the vent 99 reduces and the pressure in the outlet 101 increases whereby the vortex velocity in the amplifier 103 increases. The resulting fall of pressure at the outlet 108 and in the pipe causes a reduction in the spill flow in the valve 19 and an increase in burner flow, as described in connection with FIG. 1.

If, on the other hand, the orifice 89 is reduced to select a lower engine pressure ratio, the pressure ratio across the primary nozzle 94 increases so that the plane of impact recedes towards the nozzle 94 and reduces the pressure in outlet 101. This reduces the vortex velocity in the amplifier 103 so that the outlet pressure in the pipe 42 rises, and causes an increase in spill flow and an increase in burner flow, as previously described in connection with FIG. 1.

In the embodiment described, compressor delivery pressure and compressor inlet pressure have been used in the context of a simple single spool engine. In more complex engines having more than one spool and two or more compressors, it may not be appropriate to control the overall pressure ratio, and instead the pressures $P_4$ and $P_1$ referred to herein may be sources of pressure at the delivery and inlet of one of the compressors of the group.

What I claim is:

1. A pressure ratio control system for a gas turbine engine having a fuel pump together with means regulating fuel flow to the engine burners, comprising a pressure ratio-sensing device having a discharge nozzle and a receiver nozzle co-axially spaced therefrom, the diameters and spacing of the nozzles being such that in the region of a pre-determined critical ratio of inlet pressure to outlet pressure of the discharge nozzle, the rate of change of pressure in the receiver nozzle, occurring with a change in the discharge nozzle pressure ratio, provides a controlling parameter, restrictor means for supplying the inlet and outlet respectively of the discharge nozzle with higher and lower fluid pressures derived from two different pressure sources in the engine compressor, control means operable on the restrictor means to select a discharge nozzle pressure ratio as a selected proportion of the compressor pressure ratio of the two sources, and fluid-operated means arranged to control the fuel flow regulating means in response to a change in the pressure in the receiver nozzle, whereby the rate of combustion of fuel regulates the engine speed and therefore the said compressor pressure ratio such that the discharge nozzle pressure ratio tends towards the pre-determined critical value.

2. A pressure ratio control system according to claim 1, wherein the restrictor means includes a fluid pressure potentiometer having two restrictors, at least one of which is variable by the control means, in series between the first and second fluid pressure sources, and a tapping between the restrictors to the inlet of the discharge nozzle, the outlet of the discharge nozzle being connected to the second fluid pressure source.

3. A pressure ratio control system according to claim 1, wherein the fluid-operated means includes a jet deflection device having a power jet nozzle and a control passage to which the receiver nozzle is connected so that the variable pressure therein controls the deflection of the power jet towards and away from an outlet passage, and a vortex amplifier having a radial inlet connected to fluid pressure, a tangential inlet to which said outlet passage is connected, and a central power outlet providing a pressure signal controlling the fuel flow regulating means, which signal varies in accordance with the fluid flow through said outlet passage and tangential inlet.

4. A pressure ratio control system according to claim 1, including a secondary discharge nozzle coaxial with the first mentioned discharge nozzle and the receiver nozzle, and supplied with fluid from the first source at a pressure which is reduced by the restrictor means and by an additional restrictor, the secondary nozzle being directed at the receiver nozzle in opposition to the first nozzle, an output passage disposed between the secondary nozzle and the receiver nozzle, and a vortex amplifier having a radial inlet connected to fluid pressure, a tangential inlet to which said output passage is connected, and a central power outlet providing a pressure signal controlling the fuel flow regulating means, which signal varies in accordance with the fluid flow through said outlet passage and tangential inlet.

References Cited
UNITED STATES PATENTS

| | | | |
|---|---|---|---|
| 3,394,721 | 7/1968 | Ifield | 60—39.28UX |
| 3,511,047 | 5/1970 | Yates | 60—39.28 |

AL LAWRENCE SMITH, Primary Examiner

U.S. Cl. X.R.

137—81.5